(12) United States Patent
Li et al.

(10) Patent No.: US 8,532,108 B2
(45) Date of Patent: Sep. 10, 2013

(54) LAYER 2 SEAMLESS SITE EXTENSION OF ENTERPRISES IN CLOUD COMPUTING

(75) Inventors: Li Erran Li, Edison, NJ (US); Thomas Woo, Short Hills, NJ (US)

(73) Assignee: Alcatel Lucent, Paris (FR)

( * ) Notice: Subject to any disclaimer, the term of this patent is extended or adjusted under 35 U.S.C. 154(b) by 781 days.

(21) Appl. No.: 12/571,274

(22) Filed: Sep. 30, 2009

(65) Prior Publication Data
US 2011/0075667 A1 Mar. 31, 2011

(51) Int. Cl.
*H04L 12/28* (2006.01)

(52) U.S. Cl.
USPC .......................... 370/392; 370/401; 709/249

(58) Field of Classification Search
USPC .......................... 370/392, 401, 409; 709/249
See application file for complete search history.

(56) References Cited

U.S. PATENT DOCUMENTS

| | | | |
|---|---|---|---|
| 7,529,933 B2* | 5/2009 | Palekar et al. | 713/168 |
| 7,730,210 B2* | 6/2010 | Kuik et al. | 709/245 |
| 7,987,289 B2* | 7/2011 | Mason et al. | 709/242 |
| 8,055,789 B2* | 11/2011 | Richardson et al. | 709/238 |
| 8,064,469 B2* | 11/2011 | Webster | 370/401 |
| 8,160,063 B2* | 4/2012 | Maltz et al. | 370/389 |
| 8,213,336 B2* | 7/2012 | Smith et al. | 370/254 |
| 8,219,653 B1* | 7/2012 | Keagy et al. | 709/222 |
| 8,259,720 B2* | 9/2012 | Farinacci et al. | 370/392 |
| 8,369,333 B2* | 2/2013 | Hao et al. | 370/392 |
| 8,381,209 B2* | 2/2013 | Reumann et al. | 718/1 |
| 2009/0300605 A1* | 12/2009 | Edwards et al. | 718/1 |
| 2010/0027552 A1* | 2/2010 | Hill | 370/401 |
| 2010/0235526 A1* | 9/2010 | Carter et al. | 709/229 |
| 2010/0235630 A1* | 9/2010 | Carter et al. | 713/162 |
| 2010/0318609 A1* | 12/2010 | Lahiri et al. | 709/205 |

FOREIGN PATENT DOCUMENTS

| CN | 1770680 | 5/2006 |
|---|---|---|
| GB | 2419702 A | 2/2006 |

OTHER PUBLICATIONS

Bhaskar Prasad Rimal et al. A Taxonomy and Survey and Cloud Computing Systems, Inc. IMS and IDS, 2009 Fifth International Joint Conference ON, IEEE, Piscatawa, NJ, USA, Aug. 25, 2009, pp. 44-51.
International Search Report for :CT/US2010/049570.

* cited by examiner

*Primary Examiner* — Brian O'Connor
(74) *Attorney, Agent, or Firm* — Kramer & Amado P.C.

(57) ABSTRACT

Various embodiments relate to a Cloud Data Center, a system comprising the Cloud Data Center, and a related method. The Cloud Data Center may include a logical customer edge router to send packets between addresses in a private enterprise network and addresses in a logical network within a cloud network using Layer 2 protocol and MAC addressing. The logical network may have resources, known as virtual machines, allocated to the private enterprise network and may share a common IP address space with the private enterprise network. A directory at the Cloud Data Center may correlate the enterprise IP addresses of virtual machines with a MAC address, cloud IP address, and a location IP address within the logical network. The Cloud Data Center may double encapsulate packets with MAC, cloudIP, and locIP headers, when sending a packet to a destination in the logical network.

18 Claims, 7 Drawing Sheets

| | 401 | 402 | 403 | 404 | 405 |
|---|---|---|---|---|---|
| | entIP | MAC | locIP | cloudIP | next Hop |
| 411 | 10.1.8.8 | 1A-23-F9-CD-06-9B | 20.2.2.8 | 20.2.2.1 | 20.2.2.8 |
| 412 | 10.1.2.10 | 5C-66-AB 90-75-B1 | / | / | Dir Server |
| 413 | 10.1.2.2 | 49-BD-P2-C7 56-2A | / | / | PE |
| ... | | | | | |

*FIG. 4*

| | 401 | 402 | 403 | 404 |
|---|---|---|---|---|
| | entIP | MAC | locIP | cloudIP |
| 511 | Default | 5C-66-AB 90-75-B1 | $IP_{CA}$ | / |
| 512 | 10.1.8.8 | 1A-23-F9 CD-06-9B | 20.2.2.8 | 20.2.2.1 |
| ... | | | | |
| ... | | | | |

LAYER 2 SEAMLESS SITE EXTENSION OF ENTERPRISES IN CLOUD COMPUTING

TECHNICAL FIELD

Embodiments disclosed herein relate generally to network infrastructure and Internet communications.

BACKGROUND

A cloud computing network is a highly-scalable, dynamic service, which allows cloud computing providers to provide resources to customers over the Internet. The cloud infrastructure provides a layer of abstraction, such that customers do not require knowledge of the specific infrastructure within the cloud that provides the requested resources. Such a service helps consumers avoid capital expenditure on extra hardware for peak usage, as customers can use the extra resources in the cloud for heavy loads, while using the infrastructure already in place in a private enterprise network for everyday use.

For example, systems such as infrastructure as a service (IaaS), allow customers to rent computers on which to run their own computer applications. Such systems allow scalable deployment of resources, wherein customers create virtual machines, i.e., server instances, to run software of their choice. Customers can create, use, and destroy these virtual machines as needed, with the provider usually charging for the active servers used.

Existing services, however, do not treat the allocated resources like resources inside the private enterprise network. This may cause problems, for example, when applications send data to specific locations in the network or when the internal network and the cloud network use different address spaces or addressing schemes. There are also problems associated with isolating cloud resources from malicious attacks and ensuring that connections to cloud network resources do not compromise the internal network infrastructure. In addition, customers may face added complexity in dealing with distinct sets of internal and cloud resources, instead of treating resources from both locations as equivalent.

Accordingly, there is a need beyond IaaS to seamlessly incorporate the resources allocated to a customer in the cloud network into the customer's existing private enterprise network. Such an extension would have all allocated cloud resources look and act similarly to the resources located within the private enterprise network. Such an implementation would allow an enterprise's workload to seamlessly spread over a dynamic mix of the resources of the dedicated private enterprise network and the allocated resources in the cloud topology.

In view of the foregoing, it would be desirable to seamlessly extend a private enterprise network to include resources in a cloud network. More specifically, it would be desirable to enable communications between resources in the private enterprise network and allocated resources in the cloud network so the customer could treat cloud resources in the same manner as resources on the private network. Other desirable aspects will be apparent to those of skill in the art upon reading and understanding the present specification.

SUMMARY

In light of the present need for seamless extension of a private enterprise network into a cloud network, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments relate to a method of sending a packet received from a source in a private enterprise network to a destination in a cloud network allocated to the private enterprise network. The method may include receiving, in a logical customer edge router in a Cloud Data Center in the cloud network, a Layer 2 packet from a source in the private enterprise network, wherein the Cloud Data Center is a logical network in the cloud network comprising resources allocated to the private enterprise network. The method may further include querying, by the logical customer edge router in the Cloud Data Center, a directory server for the destination's MAC address and location IP address, encapsulating the received Layer 2 packet when the logical customer edge router in the Cloud Data Center determines the destination is within the logical network, wherein the received Layer 2 packet is encapsulated with the destination's corresponding MAC address header, further encapsulating the received Layer 2 packet with the destination's corresponding location IP header, and forwarding, by the logical customer edge router, the received Layer 2 packet to the destination, wherein the logical customer edge router forwards the received Layer 2 packet through the destination location IP address to the destination MAC address.

Various embodiments may also relate to a method of forwarding a packet originating from a source in a cloud network allocated to a private enterprise network. The method may include a hypervisor in a server hosting a virtual machine receiving a Layer 2 packet, the virtual machine being located in a logical network in the cloud network comprising resources allocated to the private enterprise network, querying a directory server in the logical network for a destination address when the Layer 2 packet's destination address is not in a virtual routing and forwarding table at the server, encapsulating the Layer 2 packet with a MAC header, the MAC header corresponding to the MAC address entry received from the directory server, further encapsulating the Layer 2 packet with a location IP header, the location IP header corresponding to the destination's cloud IP address received from the directory server, and forwarding the Layer 2 packet through the destination location IP address to the destination MAC address.

Various embodiments may also relate to a logical customer edge router connecting to at least one customer edge router in a private enterprise network and a server hosting a virtual machine allocated to the private enterprise network and sending Layer 2 packets between locations in the private enterprise network and locations in the cloud network, wherein the logical customer edge router, the virtual machine, and the customer edge router in the private enterprise network share a common IP address space and VLAN allocated to the private enterprise network.

According to the foregoing, various exemplary embodiments place cloud resources inside the enterprise's private address space, thereby seamlessly integrating the cloud resources into the enterprise's existing topology. Various embodiments also ensure security by placing cloud resources inside the security boundary of the enterprise network, isolated from any resources outside the network. A customer may thereby configure the cloud resources in the same manner as he or she configures and manages the internal resources of the enterprise network. In addition to these benefits, various embodiments also maintain the advantages of the cloud computing paradigm, namely, the highly-dynamic scalability of cloud resources.

BRIEF DESCRIPTION OF THE DRAWINGS

Some embodiments of apparatus and/or methods in accordance with embodiments are now described, by way of example only, and with reference to the accompanying drawings, in which.

DETAILED DESCRIPTION

Referring now to the drawings, in which like numerals refer to like components or steps, there are disclosed broad aspects of various exemplary embodiments.

Figure 1:
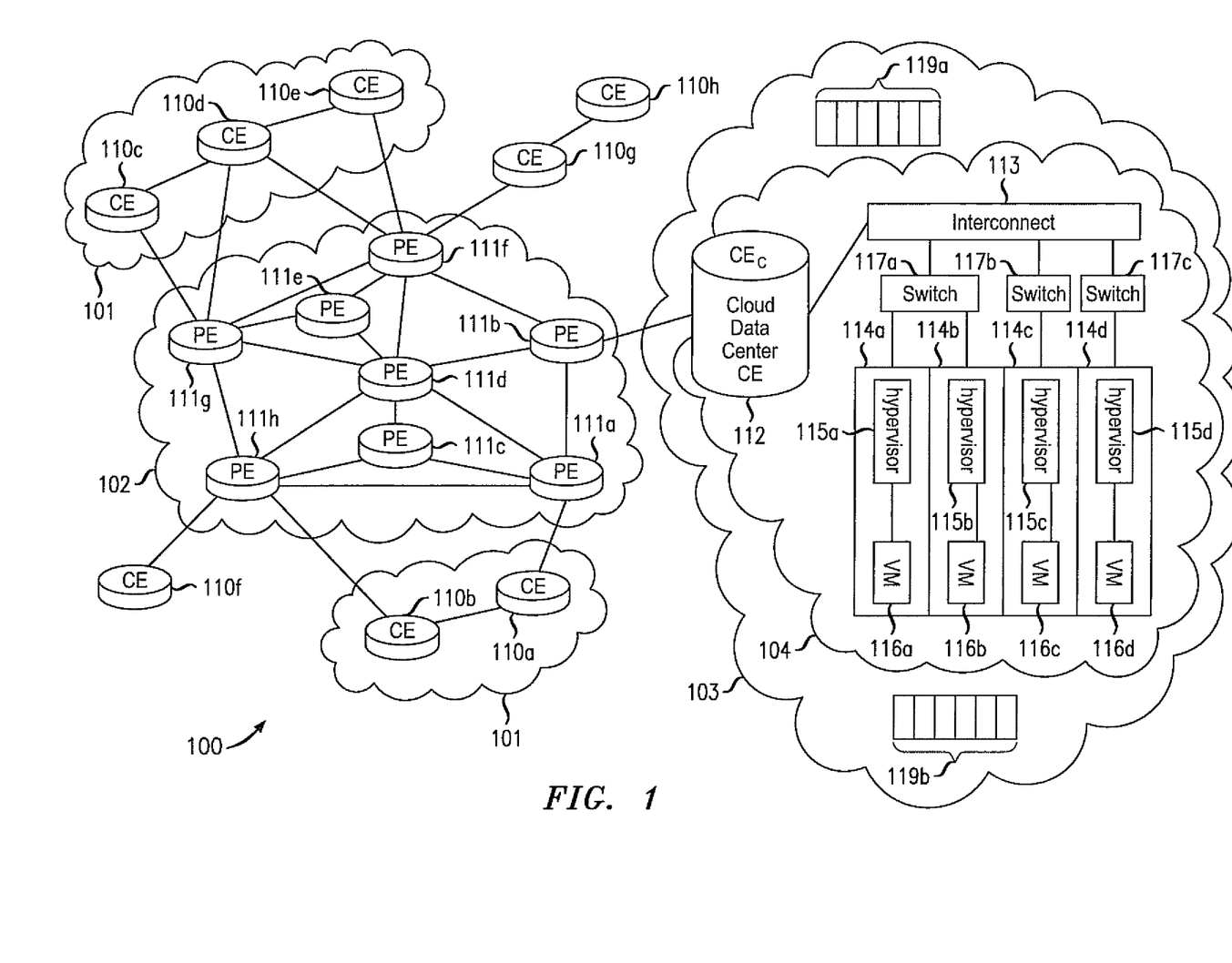
FIG. 1 is a schematic diagram of an exemplary network for extending a private enterprise network into a cloud network.

FIG. 1 is a schematic diagram of an exemplary network 100 for extending a private enterprise network into a cloud topology. In various exemplary embodiments, network 100 includes a private enterprise network 101, a service provider network 102, a cloud network 103, customer edge (CE) devices 110a-h, provider edge devices 111a-h, a Cloud Data Center CE 112, a Data Center Interconnect 113, and servers 114a-d, each of which houses a hypervisor 115a-d and a virtual machine 116a-d.

Private enterprise network 101, service provider network 102, and cloud network 103 may each be packet-switched networks. Such packet-switched networks may be any networks operating in accordance with a packet-based protocol. Thus, networks 101, 102, 103, may each operate, for example, according to Transmission Control Protocol/Internet Protocol (TCP/IP), Multi Protocol Label Switching (MPLS), Asynchronous Transfer Mode (ATM), Frame Relay, Ethernet, Provider Backbone Transport (PBT), or any other suitable packet-based protocol that will be apparent to those of skill in the art. More specifically, packet-switched networks 101, 102, 103 may communicate as a virtual private network (VPN) using Layer 3 protocols, such as MPLS.

Private enterprise network 101 may be a network incorporating hardware dedicated to a customer entity and may be configured such that the devices in the enterprise occupy the same address space. The devices in the private enterprise network 101 may share a common virtual local area network (VLAN). In an exemplary embodiment, private enterprise network 101 includes a series of customer edge (CE) devices 110a-e.

In the embodiment illustrated in FIG. 1, private enterprise network A (EntA) contains customer edge devices 110a-e located at two different sites that communicate with each other through the service provider network 102. In some embodiments, private enterprise network 101 may include devices that connect directly to each other at the same physical site.

The devices in the private enterprise network 101 may share the same address space, for example, sharing a VLAN. All devices in private enterprise network 101 may be located behind the same security boundary, such that network security may isolate devices inside the security boundary from devices outside the boundary and control the few allowed communications at the security border. This allows devices like customer edge devices 110a-f to freely pass traffic without having to implement precautions associated with crossing the security boundary.

Service provider network 102 may act as a host to private enterprise network 101. Service provider network 102 may include a series of provider edge (PE) devices 111a-h. Service provider network 102 may connect private enterprise network 101 with other networks, such as the cloud network 103, other private enterprise networks, or the Internet, among others. In some embodiments, the service provider network 102 may connect disparate portions of private enterprise network 101, though these disparate portions may share the same address space.

Cloud network 103 may include one or more servers 114a-d, which may be owned by a cloud service provider and connected in a network throughout the Internet. In an infrastructure service model, for example, the cloud service provider may allocate specific resources located in the cloud network 103 to a customer of that cloud network 103. Such specific resources may be grouped as virtual machines 116a-d.

A virtual machine 116a may be a server instance on server 114a in the cloud network 103 that is controlled by the customer located in private enterprise network 101. A customer may have the ability to create, use, and destroy any number of virtual machines 116a-d at will. This ability may be based upon user-defined criteria such as, for example, bandwidth, storage capacity, and processing needs.

The virtual machines 116a-d allocated to a customer may be connected logically to each other inside the cloud. In various embodiments, all virtual machines 116a-d allocated to a customer appear within the same VLAN. Virtual machines 116a-d may be physically located on the same server 114a or on different servers 114a-d, but maintain a logical connection to each other in the VLAN. In some embodiments, a virtual machine 116a may migrate to different physical locations, such as a different server 114a within the cloud network, and still be associated with the same VLAN.

Virtual stub (vstub) 104 may be a logical network that includes all resources in cloud network 103 allocated to a particular customer. Thus, the virtual stub 104 may include all active virtual machines 116a-d in the cloud network 103 allocated to the customer, a series of hypervisors 115a-d, which may host and control the allocated virtual machines 116a-d, a data center interconnect 113, which may be physically connected to each server 114a-d that contains allocated virtual machines 116a-d, and a Cloud Data Center CE 112, which may act as a hub for all the allocated virtual machines 116a-d in the cloud network 103. As illustrated in FIG. 1, virtual stub 104 may be included in the VLAN used by devices in the private enterprise network 101 and does not need its logical network to be physically contiguous and may include networking components connecting different physical servers 114a-d, such as the data center interconnect 113. The virtual stub may separate the servers 114a-d that are allocated to the private enterprise network 101 from a series of servers 119a, 119b that are within the cloud network 103, but not allocated to the private enterprise network. The series of servers 119a, 119b may therefore not connect to the private enterprise network 101 or share the same address space or VLAN.

A customer edge (CE) device 110a may be a node in the private enterprise network 101. CE device 110a may be a network node, such as a router or switch, configured to transmit packets to other nodes, such as other customer edge routers in private enterprise network 101, provider edge devices 111a-h in the service provider network 102, or Cloud Data Center CE 112 in the cloud network 103. CE device 110a may be capable of communication with other devices both inside and outside the private enterprise network 101 using multiple layers of the OSI reference model, such as, for example, Layer 3 communications using MPLS (L3 MPLS) and Layer 2 communications using Ethernet and Virtual Private LAN Service (VPLS). In some embodiments, the CE device 110a may be a virtual router inhabiting a physical device.

Each provider edge (PE) device 111a-h may be a node in service provider network 102 and may be a router, switch, or similar hardware device. The PE devices 111a-h may be configured to receive packets from a CE device 110a and transmit such packets over the service provider network 102. These packets may be transmitted to other destinations in private enterprise network 101, to destinations in cloud network 103, or to destinations in other networks not shown in FIG. 1.

A Cloud Data Center CE 112 may be a customer edge router and may be implemented by equipment operated by a customer of a cloud service provider. It should be apparent that although referred to as a "customer" edge device, Cloud Data Center CE 112 may be owned and/or operated by the cloud service provider or some other entity. In some embodiments, Cloud Data Center CE 112 represents a hub for the virtual stub 104 inside the cloud network 103. In some embodiments, the Cloud Data Center CE 112 may be shared by multiple enterprise networks.

In some embodiments, the cloud network 103 may also contain a directory server associated with Cloud Data Center CE 112. The directory server may maintain a directory of mapping entries. As will be discussed in further detail below, these mapping entries may correlate a location enterprise IP within the enterprise network to the address of the destination within the enterprise-extended network 100. This may include entries for a location's MAC address, cloud IP address (cloudIP), and location IP address (locIP).

A MAC address may be a unique identifier assigned to a device in the network, such as a network adapter or network interface card (NIC). The MAC address may be provided by the manufacturer of a device. The MAC address may be determined based on a query with an IP address using the Address Resolution Protocol (ARP) for Internet Protocol Version 4 (IPv4) or Neighbor Discovery Protocol (NDP) for Internet Protocol Version 6 (IPv6). The MAC header may also include a VLAN tag of the source and destination VLAN. In some embodiments, if the VLAN tag does not correspond to the VLAN of the destination, the destination drops the packet. A location IP address (locIP) may identify the location of a particular switch, e.g. switch 117a, within the virtual stub 104. A virtual machine 116a may have a locIP address that refers to the IP switch 117a on which it resides. In addition, a cloud IP address (cloudIP) may distinctly refer to each virtual machine 116a-d in the virtual stub 104.

The virtual machine 116a may therefore possess a distinct address that is logically separate from its location, as devices may refer to the directory server to locate a virtual machine by its locIP and cloudIP addresses in lieu of an assigned IP address. In one embodiment, a source in private enterprise network 101 may use an assigned IP address within the enterprise network to send information in the form of packets to the virtual machine 116a within the cloud network 103. In this instance, the Cloud Data Center CE 112 may receive such packets addressed using an Ethernet frame embedded with an IP header and may encapsulate the received packets sent to the destination virtual machine 116a with both the cloudIP address header and locIP address header corresponding to the destination virtual machine 116a within the cloud network 103. The Cloud Data Center CE 112 may correlate the enterprise ID with the locIP and cloudIP addresses of the virtual machine 116a through a directory located on a directory server.

As will be discussed in further detail below, the directory in the directory server may contain address entries for active servers and virtual machines in the private enterprise network 101 and cloud network 103. Packets sent from one network to the other may pass through the Cloud Data Center CE 112, which may use the directory to correlate the header of a received packet to the necessary header in the other network. For example, the Cloud Data Center CE 112 may use the directory to lookup MAC, cloudIP, and locIP address headers to properly send packets within the cloud network. The Cloud Data Center CE 112 may also use the directory to decapsulate cloudIP and locIP address headers originating in the cloud network 103 and replace the MAC address header with a second MAC address header to send packets within the service provider network 102 and private enterprise network 101.

While only one logical CE 112 is illustrated, alternative embodiments may include multiple logical CEs within the cloud network or Cloud Data Center. In such embodiments, virtual machines 116a-d in the enterprise address space may be allocated to different logical CEs within the Cloud Data Center, with each logical CE acting as an independent hub for a separate VLAN. Such an embodiment may also allow directory lookups, as discussed below, to be conducted by each logical CE 112 instead of hypervisors 115a-d. Multiple logical CE devices 112 may also obviate the need for locIP and cloudIP headers to cloud destinations in the virtual stub 104, as data packets could instead be tunneled to the appropriate hub logical CE 112.

A Data Center Interconnect 113 may be a switch or series of switches connecting to a series of servers 114a-d. Data Center Interconnect 113 may connect the Cloud Data Center CE 112 directly to the allocated series of servers 114a-d. Alternatively, Data Center Interconnect 113 may connect to the series of servers 114a-d through a series of intermediate switches 117a-c. In such instances, each intermediate switch 117a-c may connect to multiple servers 114a-d simultaneously. The intermediate switch 117a may have a unique location IP (locIP) address within the virtual stub 104. When receiving packets addressed to a virtual machine 116a on one of its connected servers 114a, the intermediate switch 117a may decapsulate the locIP header from the packet and may then forward the packet to the server 114a with the corresponding cloudIP address.

A server 114a may be a device that provides computing services to clients. More specifically, a server may be a networking device hosting computing resources, such as storage and processing capacity, which a client uses to, for example, execute applications or store files into memory. Thus, server 114a-d may be, for example, a chassis-based server (i.e., a blade server) that includes multiple slots, each capable of holding a physical server blade. Each physical server 114a-d may include a hypervisor 115a-d and at least one virtual machine 116a-d.

One or more hypervisors 115a-d may be located on each physical server 114a-d. In one embodiment, hypervisors 115a-d host each allocated virtual machine 116a-d physically located on the physical servers they inhabit. Each hypervisor 115a-d may thereby control one or more virtual machines 116a-d simultaneously.

Hypervisor 115a-d may be aware of the enterprise information, which may include, for example, the cloudIP addresses of each virtual machine it hosts and the locIP address of the intermediate switch 117a-c that hosts the hypervisor 115a-d. Hypervisor 115a-d may therefore recognize the enterprise membership (i.e., enterprise ID) of its hosted virtual machines 116a-d. Hypervisor 115a-d may also intercept traffic relating to its hosted virtual machines 116a-d. When the virtual machine 116a-d is sending the packet to a destination outside of the virtual stub 104, hypervisor 115a-d may encapsulate packets sent from one of its hosted virtual machine 116a-d with the MAC address header, cloudIP header, and locIP header associated with the Cloud Data Center CE 112. Hypervisor 115a-d may also decapsulate the cloudIP header of packets sent to a virtual machine 116a-d hosted by hypervisor 115a-d.

In some embodiments, hypervisor 115a-d recognizes the security parameters to each virtual machine 116a-d it hosts. These security parameters may include, for example, an embedded customer ID to prevent against any unintentional leak of information when a virtual stub 104 changes size. A hypervisor 115a-d may recognize other security features, such as a security token (or pair-wise security token) as will be discussed below, which may prevent intentional attacks by such entities as malicious hypervisors and other telnet attacks. Hypervisor 115a-d may also check the VLAN tag in the MAC address header to ensure that the packet is from the same VLAN.

Figure 2:
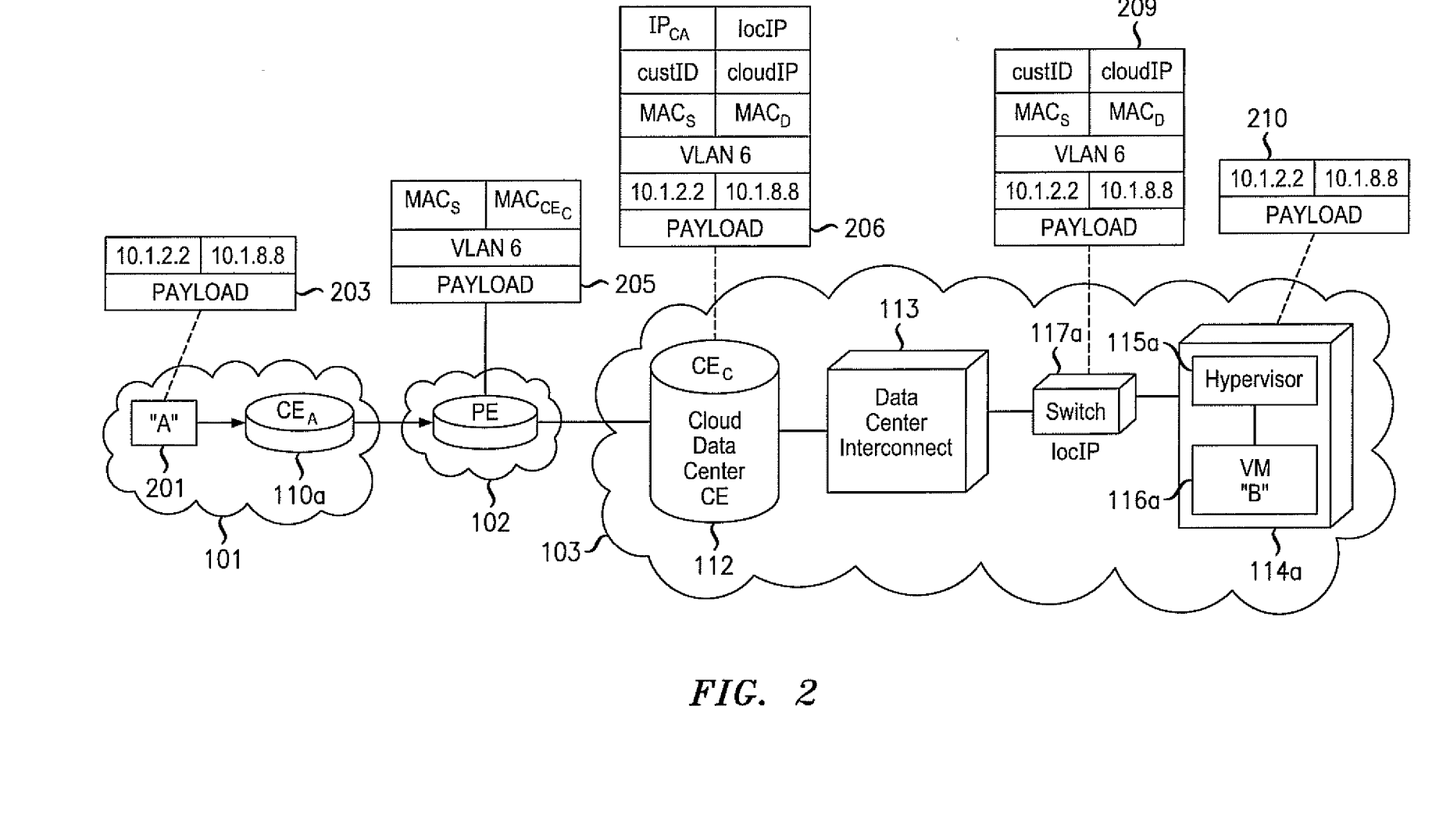
FIG. 2 is a schematic diagram of a double-encapsulated packet transfer using an L2 protocol.

FIG. 2 is a schematic diagram of a double-encapsulated packet transfer using an L2 protocol. As illustrated in FIG. 2, a device at each endpoint may address a destination using an IP address, where each IP address is inside the IP address space of the enterprise. The virtual stub 104 in the cloud network 103 may share a common VLAN with the private enterprise 101. Accordingly, each virtual machine 116a-d inside the virtual stub 104 is also assigned a corresponding address within the IP subnet.

It should be apparent that the nature of the cloud network 103 may preclude the use of specific, static IP addresses inside the cloud network 103 to determine the location of a virtual machine 116a-d. For example, a virtual machine 116a may migrate dynamically to a different physical server 114d, making it difficult to determine an appropriate IP address to use when addressing a particular virtual machine 116a at any given time. Within the cloud network 103, therefore, a virtual machine 116a stays within the same VLAN and is identified by its enterprise ID, location IP address, and cloud IP address. This addressing information may be stored in a directory in a directory server.

Accordingly, a transmission of packets to destinations within the cloud network 103 may involve double-encapsulating a packet, where, in addition to adding a MAC address header, it may also involve encapsulating each packet with an inner cloud IP header and an outer location IP header. If the packet is being sent to a destination in the private enterprise network 101 from, for example, a virtual machine 116a in the cloud network 103, the first MAC address header, cloudIP, and locIP header encapsulating the packet correspond to the addresses for the Cloud Data Center CE 112. The Cloud Data Center CE 112 acts as a hub for the virtual stub 104 and contains a distinct MAC address and cloud IP address. The Cloud Data Center CE 112 forwards the packet to the proper IP address inside the private enterprise network 101 using, for example, a second MAC address corresponding to the destination within the private enterprise network 101.

In the example illustrated in FIG. 2, a source 201 (location "A") in the private enterprise network 101 at IP address 10.1.2.2 sends a packet 203 to destination virtual machine 116a (location "B") at IP address 10.1.8.8 in the cloud network 103. This combination of IP addresses and payload may be deemed the IP packet in the illustrative embodiment.

In the illustrative embodiment, source "A" 201 may first attempt to obtain the MAC address of the destination "B" 116a through the Layer 2 network. Source "A" 201, may therefore generate an ARP request, which may reach customer edge router $CE_A$ 110a. If $CE_A$ 110a does not know the IP-to-MAC address mapping for destination "B" 116a through its VRF table, $CE_A$ 110a may then broadcast the ARP request to a connected provider edge router PE 111a, which may be located in the service provider network 102. PE 111a, may in turn broadcast the ARP request to all other provider edge routers 111a-f in private network 102. This may lead to the Cloud Data Center CE 112 in cloud network 103 receiving the ARP request. When the Cloud Data Center CE 112 receives the ARP request, it may then query a directory server to obtain the MAC address of destination "B" 116a. Once obtained, the MAC address may be sent back through a reverse path to source "A" 201.

Source "A" 201, using the acquired MAC address, will send the packet 205 through its Layer 2 network. Packet 205 contains the IP packet 203, with an amended MAC address. This MAC address may also include a VLAN tag, indicating the VLAN of the source. In the illustrative embodiment, destination "B" 116a is in the cloud network 103, so the packet may be tunneled to Cloud Data Center CE 112. The Cloud Data Center CE 112 queries the directory server for the cloud IP address and location IP address for destination "B" 116a. The Cloud Data Center CE 112 subsequently encapsulates the packet 205, first with the cloud IP address header, then with the locIP address header. Cloud Data Center CE 112 may then send the double-encapsulated packet 206 through the Data Center Interconnect 113 and other devices in the cloud network 103 to the intermediate switch 117a with the corresponding destination locIP address.

The intermediate switch 117a may then decapsulate the locIP header from the packet 206 and transmit the modified packet 209 to the corresponding destination cloudIP address. At the server 114a corresponding to the destination cloudIP address, the hypervisor 115a on server 114a decapsulates the MAC address header and cloudIP header from the modified packet 209 and transmits the IP packet 210 to the destination virtual machine "B" 116a on the server 114a. In some embodiments, the hypervisor 115a may also verify a security token in packet 210 to verify that the packet is from the same enterprise network. In some embodiments, hypervisor 115a may check the VLAN tag in the MAC address header to verify whether the destination "B" 116a belongs to the VLAN. When the destination "B" 116a does not, the hypervisor 115a may drop the modified packet 209.

Figure 3:
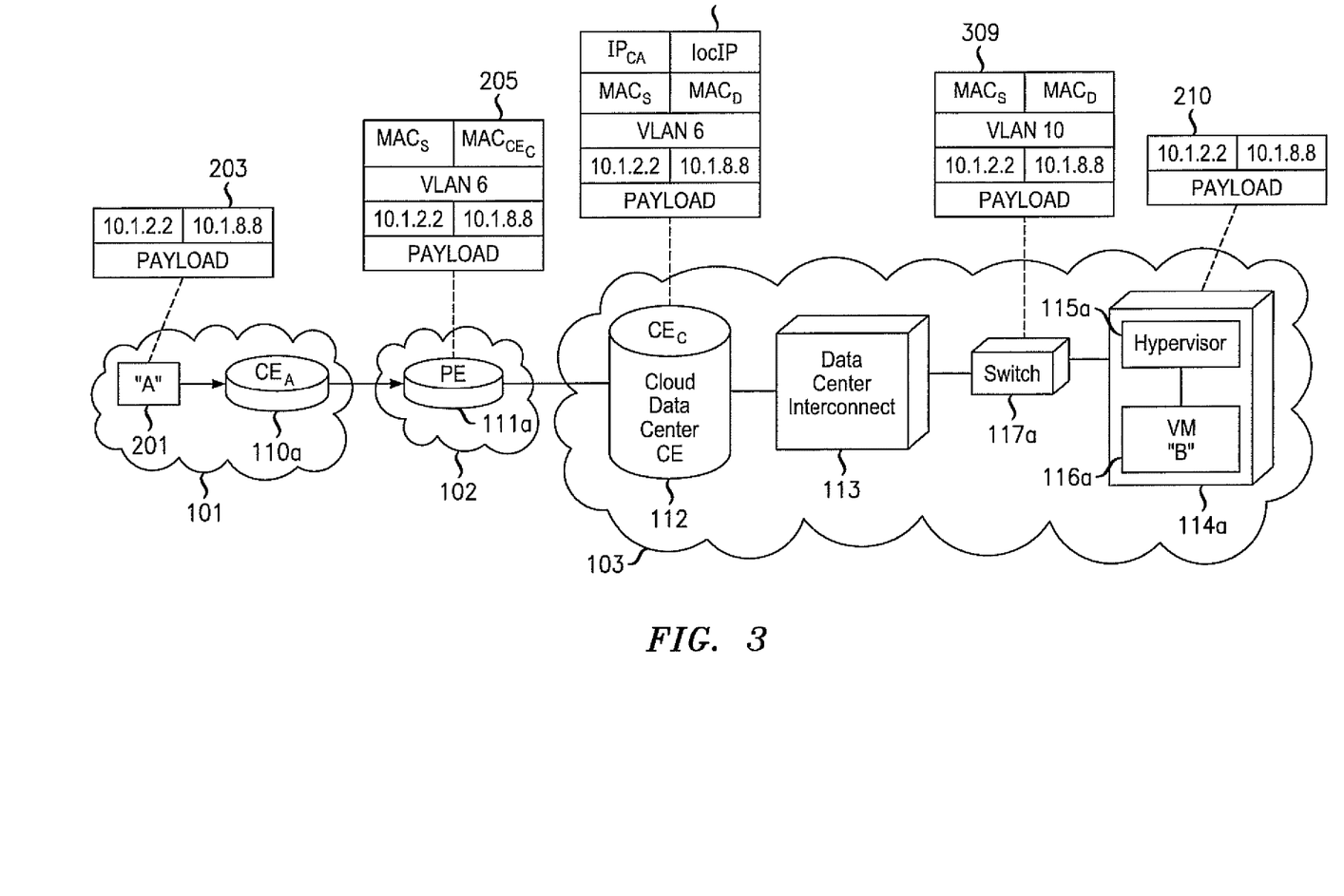
FIG. 3 is a schematic diagram of a packet transfer using etherIP and VLAN translation.

FIG. 3 is a schematic diagram of a packet transfer using etherIP and VLAN translation. The illustrated embodiment may share the same system components as the illustrative embodiment in FIG. 2. As in FIG. 2, source "A" 201 in the private enterprise network 101 at IP address 10.1.2.2 sends a packet 203 to destination virtual machine "B" 116a at address 10.1.8.8 in the cloud network 103. The source "A" 201 queries for the appropriate MAC address of the destination and sends a modified packet 205 to the Cloud Data Center CE 112.

In some embodiments, the Cloud Data Center CE 112 may translate the VLAN to a locally unique one. In the illustrative embodiment, the Cloud Data Center CE 112 translates the source VLAN 6 to a locally unique VLAN 10. In this embodiment, each device is assigned a MAC address local to the switch, resulting in each MAC address being unique once reaching an intermediate switch 117a in the cloud network 103. Accordingly, Cloud Data Center CE 112, upon receiving modified packet 205, only encapsulates the packet with one IP header. The Cloud Data Center encapsulates the packet 205 with the locIP header of the destination switch 117a. Cloud Data Center CE 112 forwards the single-encapsulated packet 306 through Data Center Interconnect 113 to switch 117a. The switch 117a decapsulates the single-encapsulated packet 306. The switch is able to forward the modified packet 309 to the destination "B" 116a because, in this embodiment, the MAC address is locally unique, so a unique cloudIP address for each VM 116a-d is unnecessary.

Figure 4:
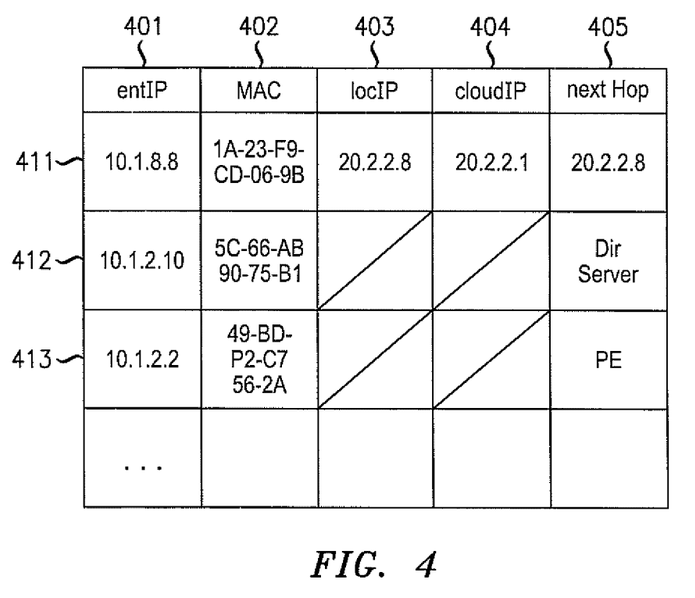
FIG. 4 is a schematic diagram of an exemplary Virtual Routing and Forwarding table for network devices found in the extended enterprise network.

FIG. 4 is an exemplary Virtual Routing and Forwarding (VRF) table 400 of the logical CE router 112. Other devices, such as customer edge devices 110a-e in private enterprise network 101 and provider edge devices 111a-h in service provider network 102 may also maintain similar VRF tables 400.

The entIP field 401 may correspond to the Enterprise ID of a location. In an exemplary embodiment, resources within the virtual stub 104 share the same VLAN and as a result, may share the same address space. In the illustrated embodiment, each entIP is a locally unique IP address. The MAC field 402 may correspond to a MAC address of a location. The MAC field may be used by Layer 2 protocols to identify a device's location in the private enterprise network 101 and may be used with locIP field 403 and cloudIP field 404 to identify a device in cloud network 103.

The locIP field 403 corresponds to the location IP address of devices in cloud network 103. The locIP may correspond to the address of the intermediate switch 117a in cloud network 103 that hosts the entry's virtual machine 116a. In the illustrative embodiment of FIG. 4, the virtual machine entry 411 has a location IP address of 20.2.2.8, corresponding to an intermediate switch 117a that hosts the corresponding virtual machine 116a.

The cloudIP field 404 may correspond to the cloudIP address of a virtual machine 116a in the cloud network 103. The intermediate switch 117a at a locIP address 403 has distinct, non-overlapping cloudIP addresses 404 for each virtual machine 116a it hosts. The Cloud Data Center may allocate the cloudIP addresses among the virtual machines 116a-d in the cloud network 103. In the illustrative embodiment, virtual machine entry 411 has a cloudIP of 20.2.2.1, so that when intermediate switch 117a receives a packet for virtual machine 116a, the switch may forward the packet to the specific virtual machine 20.2.2.1 through the hypervisor 115a.

The nextHop field 405 refers to the next location in the enterprise network 100 to which a device should send a packet. In the illustrative embodiment, entry 413 has an entIP address 401 with a MAC address of 49-BD-D2-C7-56-2A, corresponding to a location in the private enterprise network 101. Accordingly, that location does not have applicable locIP 403 or cloudIP 404 addresses, as those may only be used by addresses within the cloud network 103. The corresponding nextHop 405 entry from the Cloud Data Center CE 112 is therefore to the connected provider edge device 111a, which upon receipt of packets for the destination with MAC address 49-BD-D2-C7-56-2A, will refer to its own VRF table and forward it to the entry's corresponding nextHop 405 address. This process will continue on each device in sequence until the packet eventually reaches the destination with MAC address 49-BD-D2-C7-56-2A in the private enterprise network 101.

Figure 5:
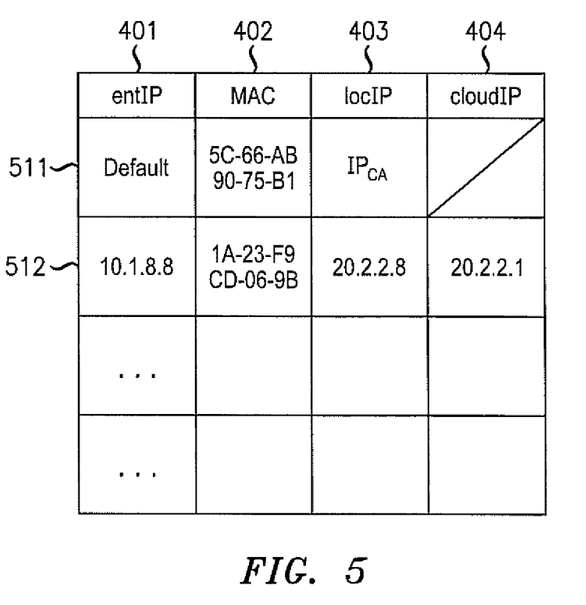
FIG. 5 is a schematic diagram of an exemplary directory table of location entries for network devices found in the cloud network.

FIG. 5 is an exemplary directory table in the directory server. The directory table 500 is similar to the Cloud Data Center VRF table 400, maintaining entIP field, MAC field, locIP field, and cloudIP field, except that the directory table 500 does not maintain a nextHop field 405. This is because the directory table 500 does not maintain forwarding information; rather, the directory table 500 simply maintains a comprehensive listing of MAC 402, locIP 403, and cloudIP 404 addresses for locations in both the private enterprise network 101 and the cloud network 103.

In the illustrative embodiment, the "Default" entry 511 has a MAC address of 5C-66-AB-90-75-B1, only $IP_{CA}$ as its locIP 403 address, and no applicable cloudIP 404 address. The default entry 511 refers to devices within the private enterprise network 101, which have no explicit locIP 403 or cloudIP 404 addresses. The $IP_{CA}$ entry means that packets with destinations not specifically listed as an entry 412 with valid locIP 403 and cloudIP 404 addresses in the directory 500 should be directed towards the Cloud Data Center CE 112, which will then use its VRF table 400 to forward the packet to the proper destination within the private enterprise network 101.

In an exemplary embodiment, a virtual machine 116 may shut down. When a virtual machine shuts down, the VM's entry in directory 500 at the directory may be deleted. In another exemplary embodiment, a VM may migrate to a different server, for example, from 114a to 114c. When a VM migrates to another server 114c, its locIP address will be updated in the directory 500 to reflect the new server 114c where the VM 116a is now located. A virtual machine 116a may also migrate to a new VLAN or Cloud Data Center CE 112. In the case of a stale entry (a device with an outdated VRF table), the switch 117a at the former locIP address will forward the wrongly-addressed packet to the directory server at the new Cloud Data Center CE. The directory server at the old Cloud Data Center CE 112 will then correct the VRF table of the stale switch via unicast.

Figure 6:
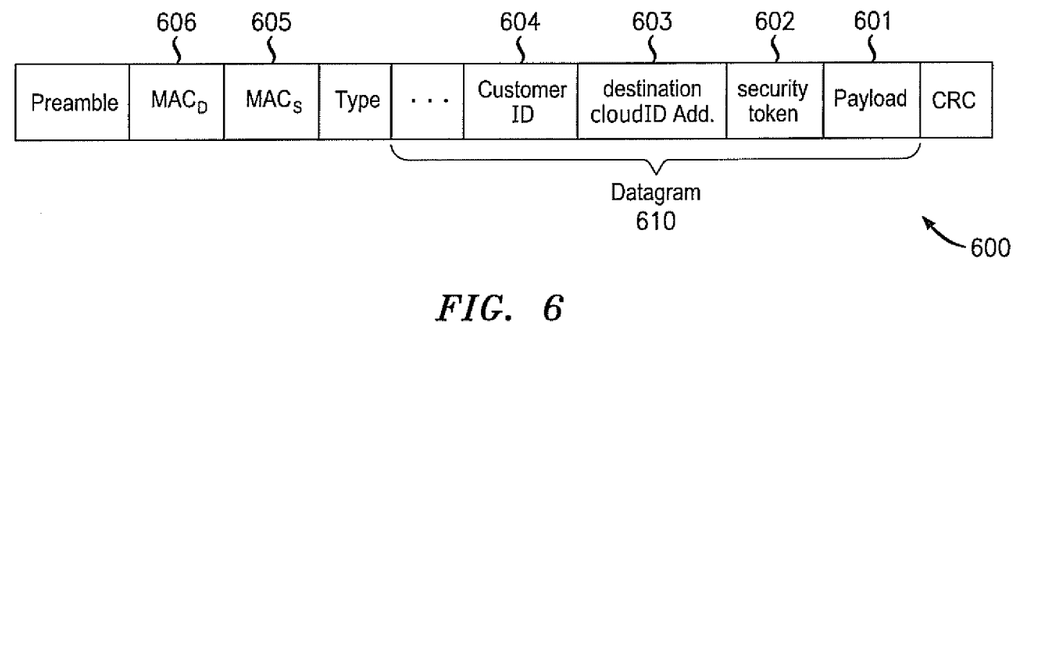
FIG. 6 is a schematic diagram illustrating the contents of an exemplary datagram transmitted through the extended enterprise network.

FIG. 6 is an exemplary illustration of an Ethernet frame used in the system. The Ethernet frame 600 carries the IP datagram, which may vary in length. FIG. 6 illustrates an exemplary Ethernet frame of a double-encapsulated packet that contains a datagram 610. The datagram 610 contains, among other information, the inner cloudIP header and the outer locIP header, the destination cloudIP address 603, and the payload 601. Source and destination addresses 605, 606 are also contained within the frame 600.

The datagram 610 may also include a security token 602. The security token may comprise a combination of, for example, an enterprise-specific key, enterprise ID, and destination IP address. A hypervisor 115a may attempt to verify the security token 602 and if a packet contains the wrong security token 602, drop the packet. In one embodiment, a packet may be encoded by a pair-wise security token 602. A pair-wise security token may be derived from a pair-wise key, which is an individual key used for only one user. This may help to prevent attacks from malicious hypervisors 115a by localizing the attack to virtual machines 116a-d that have security associations with the malicious hypervisor 115a.

In addition, datagram 610 may include Customer ID 604 for security reasons, as the Customer ID 604 prevents sending packets to virtual machines 116a-d not within the virtual stub 104. This situation may occur, for example, if a virtual machine 116a-d migrates or is shutdown and devices continue to send traffic to that virtual machine 116. In one embodiment, the payload 601 may be encrypted with a shared group key. The shared group key may be shared amongst members of a given customer group.

Figure 7:
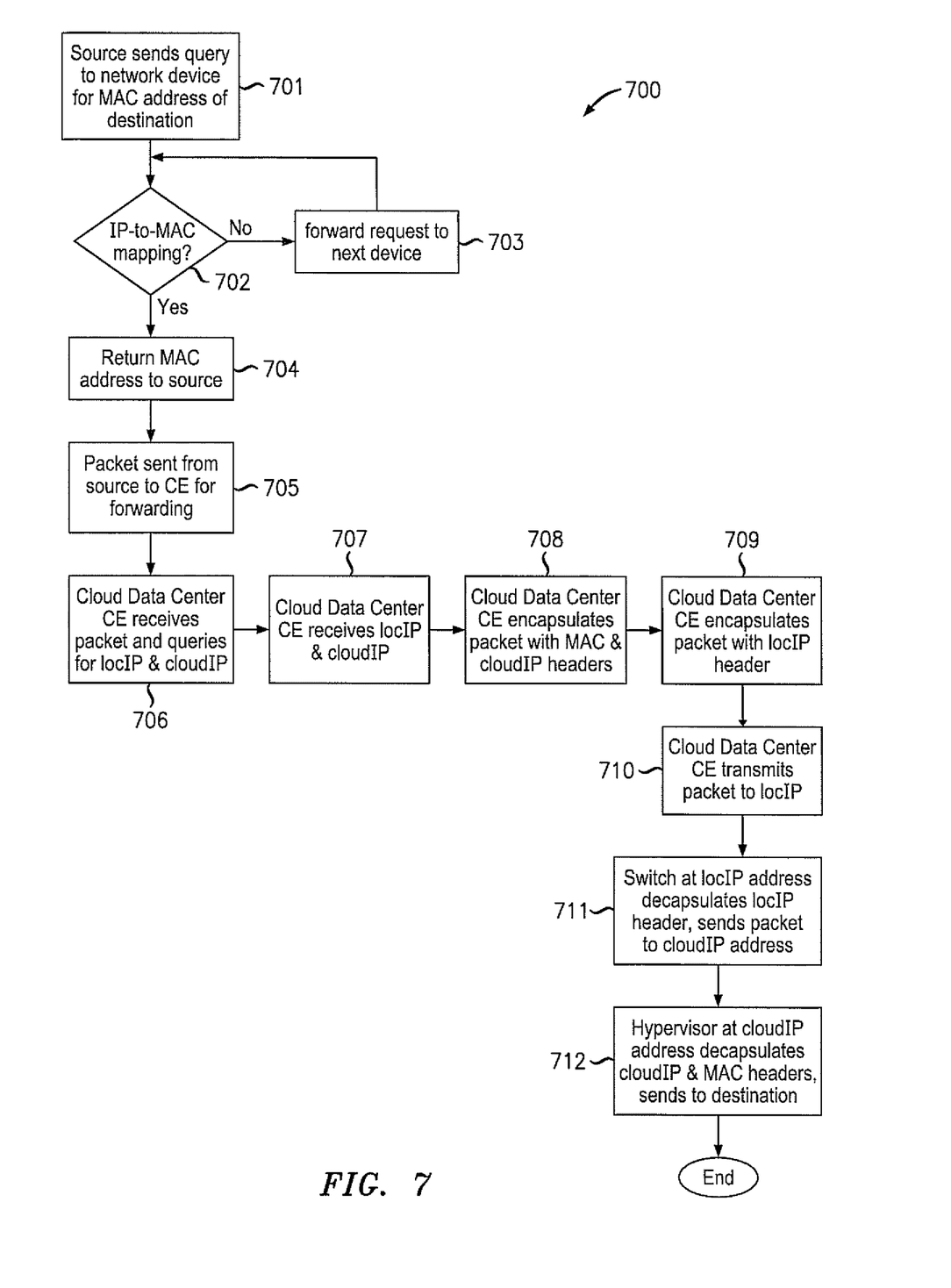
FIG. 7 is a flowchart of an exemplary embodiment of a method of sending a packet from a location in the private enterprise network to a destination in the cloud network.

FIG. 7 is a flowchart of an exemplary embodiment of a method 700 of sending a packet 203 from a source "A" 201 in the private enterprise network 101 to a destination "B" 116a in the cloud network 103 using double encapsulation and a Layer 2 protocol. At step 701, source "A" 201 queries customer edge router 110a in the private enterprise network 101 for the MAC address of destination "B" 116a. In step 702, the customer edge router 110a queries its VRF table for an IP-to-MAC mapping of destination "B" 201. In step 703, if there is no mapping in the VRF table for customer edge router 110a, the customer edge router 110a broadcasts the query in the form of an ARP request through the system. In step 704, the customer edge router 110a returns the MAC address of destination "B' 116a when the IP-to-MAC address mapping is in the device's VRF table.

The loop of steps 702-704 are repeated for each forwarding device until each device returns a MAC address. This may proceed through devices until it reaches the Cloud Data Center CE 112. The Cloud Data Center at step 702 alternatively refers to its directory to obtain the IP-to-MAC address mapping of the destination "B" 116a. In step 704, the Cloud Data Center CE 112 returns the MAC address to source "A" 201.

At step 705, a packet 205 from source "A" 201 in the private enterprise network 101 may be transmitted to a logical CE device 110a in the private enterprise network 101, which may forward the packet 205 through at least a PE device 111a in service provider network 102 to the Cloud Data Center CE 112 in the cloud network 103. In step 706, the Cloud Data Center CE 112 may again query the directory server. The second query may entail a lookup of directory 500 for the location IP (locIP) and cloud IP (cloudIP) of the destination "B" if the location is inside the cloud network 103. If destination "B" is in the cloud network 103, in step 707, the Cloud Data Center CE 112 may retrieve the corresponding destination cloudIP address and location IP addresses.

In step 708, Cloud Data Center CE 112 may encapsulate the packet with a MAC header and a header corresponding to the retrieved cloudIP address. In step 709, Cloud Data Center CE 112 may encapsulate the modified packet with a header corresponding to the retrieved locIP address. In step 710, the Cloud Data Center CE 112 may transmit the double-encapsulated packet 206 through cloud network 103 to the corresponding locIP address.

In step 711, an intermediate switch 117a at the locIP address may decapsulate the locIP header from the double-encapsulated packet 206 and may transmit the modified packet 209 to the corresponding cloudIP address. In step 712, the hypervisor 115a at the server 114a at the corresponding cloudIP address may decapsulate the modified packet 209 removing both the cloudIP header and the MAC address header and may transmit the packet 210 to the corresponding virtual machine 116a at the destination "B." In an alternative embodiment, the hypervisor 115a may first validate the received packet 210 by verifying the included security token 502 before transmitting the packet 210 to the virtual machine 116a. In some embodiments, the hypervisor 115a may first validate the VLAN tag by verifying the packet is coming from the same VLAN.

In an alternative embodiment, in step 710, the Cloud Data Center CE 112 sends a single-encapsulated packet 306 through the virtual stub 104 to destination "B" 116a. In this alternative embodiment, each VLAN ID is unique. As such, in step 708, the Cloud Data Center CE 112 may translate the VLAN ID to a locally unique one, making the MAC address locally unique for a given switch. Accordingly, at step 711, intermediate switch 117a may send modified packet 309 to the hypervisor 115a using only the MAC addresses. In step 712, the hypervisor 115a decapsulates the MAC address header before sending IP packet 210 to destination "B" 116a.

Figure 8:
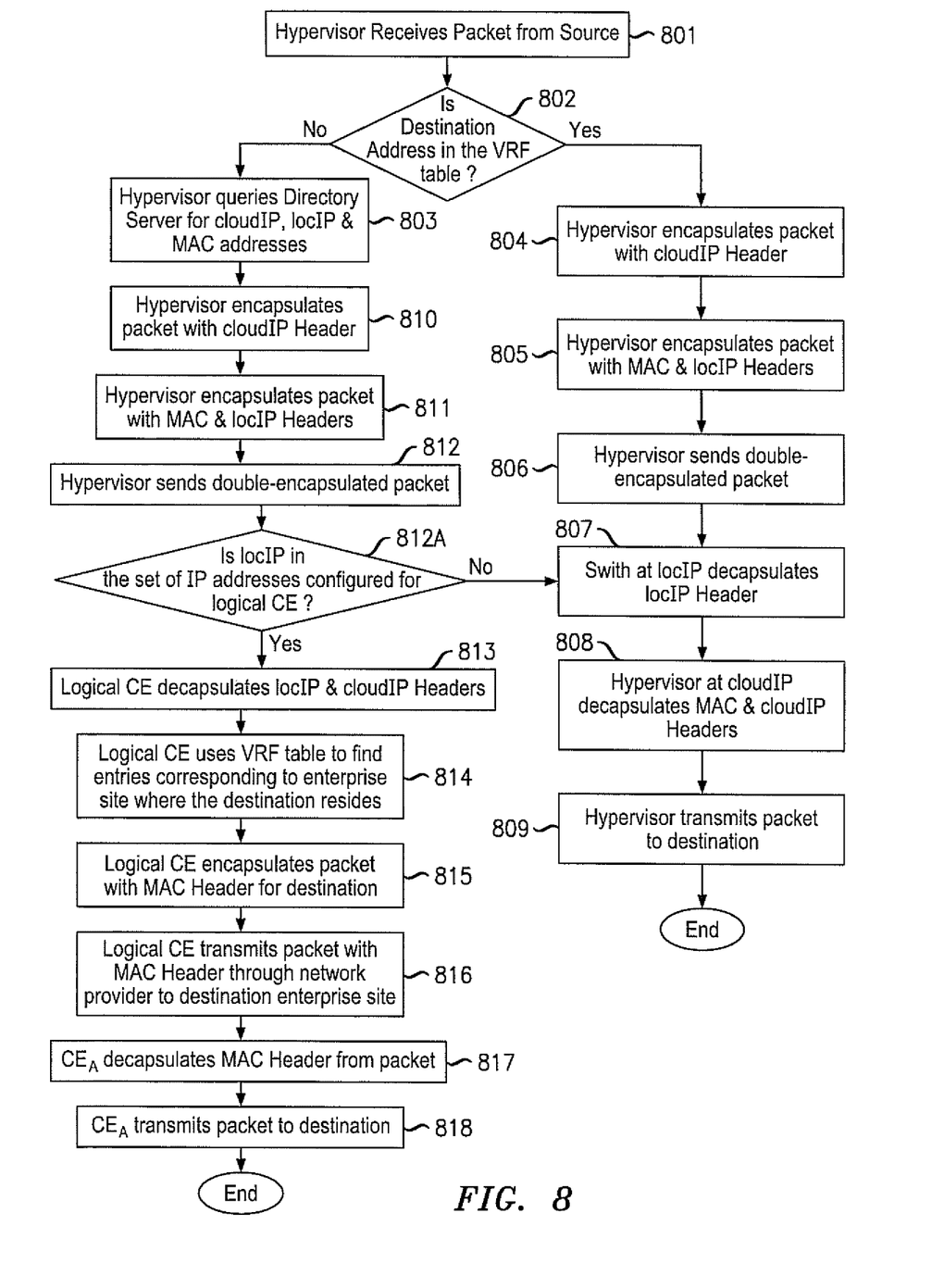
FIG. 8 is a flowchart of an exemplary embodiment of a method of sending a packet from a location inside the cloud network.

FIG. 8 illustrates an exemplary method 800 of sending a packet from a source in the cloud network 103. In step 801, the hypervisor 115a on the server 114a of source "B" receives a packet 210 from the source "B" virtual machine 116a. In step 802, the hypervisor 115a checks whether the destination address is in its VRF table. Step 804 follows if a forwarding entry for destination "A" 201 is present, whereas step 803 follows if the destination address "A" 201 is not listed.

In step 804, the hypervisor 115a encapsulates the packet 210 with the corresponding cloudIP header. In step 805, the hypervisor 115a then encapsulates the modified packet 209 with corresponding locIP and MAC address headers. The MAC address header may also include a VLAN tag. In step 806, the hypervisor 115a sends the double-encapsulated packet 206 to the corresponding locIP address.

In step 807, if the destination "A" is within the cloud network 103, the intermediate switch 117b at the corresponding locIP address decapsulates the locIP header from the double-encapsulated packet 206 and sends the modified packet 209 to the corresponding cloudIP address. In step 808, the hypervisor 115c at the corresponding cloudIP address decapsulates the modified packet 209 of both the cloudIP and MAC address headers. In step 809, the hypervisor 115c transmits the packet 210 to the destination "A" VM 116c. In some embodiments, the hypervisor 115c first checks the modified packet's security token 602 for verification before sending the packet 203 to the destination "A" VM. In some embodiments, hypervisor 115a may check the VLAN tag to verify the packet 209 is coming from the same VLAN.

Alternatively, when, in step 802, it is determined that the destination is in the private enterprise network 101, method 800 proceeds to step 803. In step 803, the hypervisor 115a queries the directory server for the destination "A" MAC address, cloudIP address, and locIP address. When the destination is in the private enterprise network 101, the corresponding destination locIP is the IP address of the intermediate switch IP 117a connected to the Cloud Data Center CE 112 and the corresponding MAC and cloudIP addresses correspond to the Cloud Data Center CE 112.

Method 800 proceeds to 810, which corresponds to step 804, described in detail above. Method 800 then proceeds to steps 811 and 812, which correspond to steps 805 and 806, described in detail above. This results in the cloudIP and MAC addresses of the double-encapsulated packet 209 corresponding to the Cloud Data Center CE 112.

Accordingly, in step 812a, the Cloud Data Center CE 112 determines if the packet is in the same IP address space as the Cloud Data Center CE 112. If it is not, the method 800 proceeds to step 807. If the packet is in the same IP address space, the method 800 proceeds to step 813, where Cloud Data Center CE 112 decapsulates the double-encapsulated packet 206 of both its locIP, MAC, and cloudIP headers. In step 814, Cloud Data Center CE 112 uses the directory 400 to find the corresponding entry for the destination address "A" in the private enterprise network 101.

In step 815, the Cloud Data Center CE 112 replaces the MAC address with the MAC address corresponding to the destination "A" address within the private enterprise network 101. In step 816, the Cloud Data Center CE 112 transmits the packet 206 through private enterprise network 101 to destination "A" 201. In some embodiments, when there is no entry in the directory, Cloud Data Center CE 112 may broadcast packet 206 to each device in the private enterprise network 101 using a MAC broadcast address, such as FF-FF-FF-FF-FF-FF. In step 817, the customer edge device 111*a* at the destination "A" address in private enterprise network 101 decapsulates the MAC header of the packet 205 and in step 718, the customer edge device 111*a* transmits the packet 203 to the corresponding destination address "A" 201. In an alternative embodiment, customer edge router 110*a* may check the VLAN tag to verify packet 205 is from the same VLAN.

In some embodiments, each VLAN is a unique one, making the cloudIP address unnecessary. Accordingly, the hypervisor 115*a* does not encapsulate IP packet 210 with a cloudIP header. Instead, hypervisor 115*a* sends a single-encapsulated packet 309 to a destination "A" 201.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a network node (e.g., router or switch). Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications may be implemented while remaining within the spirit and scope of the invention. Accordingly, the foregoing disclosure, description, and figures are for illustrative purposes only and do not in any way limit the invention, which is defined only by the claims.

What is claimed is:

1. A method of sending a packet received from a source in a private enterprise network to a destination in a cloud network allocated to the private enterprise network, said method comprising:
   receiving, by a logical customer edge router in a Cloud Data Center in the cloud network, a Layer 2 packet from a source in the private enterprise network, wherein the logical customer edge router is located in a logical network in the cloud network comprising resources allocated to the private enterprise network and the Layer 2 packet is addressed to a destination in the logical network;
   querying, by the logical customer edge router, a directory server for a MAC address of the destination and a location IP address of the destination;
   encapsulating, by the logical customer edge router, the Layer 2 packet when the logical customer edge router determines the destination is within the logical network, wherein the Layer 2 packet is encapsulated with a header including the MAC address of the destination;
   further encapsulating, by the logical customer edge router, the Layer 2 packet with a header including the location IP address of the destination; and
   forwarding, by the logical customer edge router, the Layer 2 packet to the destination, wherein the logical customer edge router forwards the Layer 2 packet through the location IP address of the destination to the MAC address of the destination.

2. The method of claim 1, further comprising:
   decapsulating, by a switch at the location IP address of the destination, the location IP header of the Layer 2 packet;
   forwarding, by the destination switch, the Layer 2 packet to the MAC address of the destination;
   decapsulating, by a destination server at the MAC address of the destination, the MAC header of the Layer 2 packet; and
   forwarding, by the destination server, the Layer 2 packet to the destination within the destination server.

3. The method of claim 2, further comprising:
   verifying, by a hypervisor in the destination server, that the Layer 2 packet is from the same enterprise, wherein the hypervisor inspects a security token in the header of the Layer 2 packet; and
   discarding, by the hypervisor, the Layer 2 packet when the Layer 2 packet's security token is not verified.

4. The method of claim 3, wherein the security token comprises at least an enterprise-specific key, an enterprise ID, and a destination IP address.

5. The method of claim 2, further comprising:
   verifying, by a hypervisor in the destination server, that the Layer 2 packet is from the same VLAN, said verification performed by the hypervisor analyzing the Layer 2 packet's VLAN tag in the MAC address header;
   discarding, by the hypervisor, the Layer 2 packet when the destination does not belong to the same VLAN;
   stripping, by the hypervisor, the MAC address header from the Layer 2 packet when the destination belongs to the same VLAN; and
   forwarding, by the hypervisor, the Layer 2 packet to the destination.

6. The method of claim 1, further comprising:
   receiving, by the logical customer edge router, a request query for the MAC address of the destination from the source;
   querying, by the logical customer edge router, a directory in a directory server for the MAC address of the destination; and
   forwarding, by the logical customer edge router, the MAC address of the destination to the source.

7. The method of claim 1, further comprising:
   querying, by the logical customer edge router, a directory server for a cloud IP address of the destination; and
   encapsulating, by the logical customer edge router, the Layer 2 packet with a cloud IP header including the cloud IP address of the destination, wherein the forwarding step comprises the logical customer edge router forwarding the Layer 2 packet through the location IP address of the destination to the cloud IP address of the destination.

8. The method of claim 7, further comprising:
   decapsulating, by a switch at the location IP address of the destination, the location IP header of the Layer 2 packet;
   forwarding, by the destination switch, the Layer 2 packet to the cloud IP address of the destination;

decapsulating, by a destination server at the cloud IP address of the destination, the cloud IP header of the Layer 2 packet; and forwarding, by the destination server, the Layer 2 packet to the destination within the destination server.

9. A method of forwarding a packet originating from a source in a cloud network allocated to a private enterprise network, said method comprising:

receiving, by a hypervisor in a server hosting a source virtual machine, a Layer 2 packet, the virtual machine being located in a logical network in the cloud network comprising resources allocated to the private enterprise network;

querying, by the hypervisor, a directory server in the logical network for a destination address when the destination address of the Layer 2 packet is not in a virtual routing and forwarding table at the server, encapsulating, by the hypervisor, the Layer 2 packet with a first MAC header, the first MAC header corresponding to a MAC address entry received from the directory server;

further encapsulating, by the hypervisor, the Layer 2 packet with a location IP header, the location IP header corresponding to a location IP address of the destination received from the directory server; and forwarding, by the hypervisor, the Layer 2 packet through the location IP address of the destination to the MAC address of the determination.

10. The method of claim 9, further comprising:
decapsulating, by a logical customer edge router in a Cloud Data Center, the location IP header of the packet.

11. The method of claim 10, further comprising:
replacing, by the logical customer edge router, the first MAC header with a second MAC header corresponding to the destination MAC address when there is an entry for the destination in the directory server;

tunneling, by the logical customer edge router, the Layer 2 packet with the second MAC header to the destination MAC address when there is an entry for the destination in the directory server;

replacing, by the logical customer edge router, the first MAC address with a MAC broadcast header when there is no entry for the destination in virtual routing and forwarding table; and tunneling, by the logical customer edge router, the Layer 2 packet with the MAC broadcast header to each customer edge router in the private enterprise network when there is no entry for the destination in the virtual routing and forwarding table.

12. The method of claim 9, further comprising:
computing, by the hypervisor, a security token comprising a combination of an enterprise-specific key, enterprise ID, and destination IP address; and encapsulating, by the hypervisor, the packet with the security token.

13. The method of claim 12 further comprising:
decapsulating, by a customer edge router at the destination in the private enterprise network, the MAC header;

verifying, by the customer edge router at the destination, the security token in the header of the received packet and discarding; and discarding, by the customer edge router at the destination, the received packet when the security token is not verified.

14. The method of claim 12, further comprising:
further encapsulating, by the hypervisor, the Layer 2 packet with a cloud IP header, the cloud IP header corresponding to a IP address of the destination received from the directory server.

15. The method of claim 14, further comprising:
decapsulating, by the logical customer edge router in a Cloud Data Center, the cloud IP header of the packet.

16. A logical customer edge router in a cloud network connected to at least one customer edge router in a private enterprise network and a server hosting a virtual machine in the cloud network allocated to the private enterprise network, the logical customer edge router sending Layer 2 packets between locations in the private enterprise network and locations in the cloud network, wherein the logical customer edge router, the virtual machine, and the customer edge router in the private enterprise network share a common IP address space and VLAN allocated to the private enterprise network.

17. The logical customer edge router of claim 16, wherein the logical customer edge router shares a common IP address space with a directory server containing a directory of devices in the private enterprise network and devices in a logical network in the cloud network comprising resources allocated to the private enterprise network.

18. The logical customer edge router of claim 17, wherein the directory maintains address information of the devices in the private enterprise network and devices in the logical network, the address information including:
an enterprise ID,
a location IP address,
a MAC address, and
a cloud IP address.

* * * * *